United States Patent
Du et al.

(10) Patent No.: US 11,792,301 B1
(45) Date of Patent: Oct. 17, 2023

(54) PARALLELIZED AUTOMATED CREATION OF PROXY MANIFESTS

(71) Applicant: Amazon Technologies, Inc., Seattle, WA (US)

(72) Inventors: Benjamin Du, Kenmore, WA (US); Ahad Rana, Sammamish, WA (US); Md Omar Faroque, Frisco, TX (US); Jong Hyun Lim, Bellevue, WA (US); Md Humayun Arafat, Bellevue, WA (US); Melanie Sifen, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/950,961

(22) Filed: Sep. 22, 2022

(51) Int. Cl.
  *G06F 15/173* (2006.01)
  *H04L 67/63* (2022.01)
  *H04L 67/1001* (2022.01)
  *H04L 12/46* (2006.01)
  *H04L 45/02* (2022.01)

(52) U.S. Cl.
  CPC .......... *H04L 67/63* (2022.05); *H04L 12/46* (2013.01); *H04L 45/02* (2013.01); *H04L 67/1001* (2022.05)

(58) Field of Classification Search
  CPC ..... H04L 67/63; H04L 67/1001; H04L 12/46; H04L 45/02
  USPC ....................................................... 709/226
  See application file for complete search history.

(56) References Cited

U.S. PATENT DOCUMENTS

| | | | |
|---|---|---|---|
| 7,643,489 B2 * | 1/2010 | Wang | H04L 47/70 370/395.2 |
| 8,204,982 B2 * | 6/2012 | Casado | H04L 63/10 709/224 |
| 8,478,812 B2 * | 7/2013 | Oliver | H04L 67/303 709/221 |
| 10,708,379 B1 * | 7/2020 | Gupta | G06F 11/1471 |
| 10,827,020 B1 * | 11/2020 | Cao | H04L 67/561 |
| 11,153,412 B1 * | 10/2021 | Varadan | H04L 67/133 |
| 11,457,080 B1 * | 9/2022 | Meduri | H04L 67/60 |
| 2006/0056328 A1 * | 3/2006 | Lehane | H04L 45/02 370/315 |
| 2008/0183840 A1 * | 7/2008 | Khedouri | H04N 21/4788 709/217 |
| 2013/0227284 A1 * | 8/2013 | Pfeffer | H04N 21/64707 713/168 |
| 2019/0037419 A1 * | 1/2019 | Knaappila | H04W 40/12 |
| 2022/0239696 A1 * | 7/2022 | Konda | H04L 61/4511 |
| 2022/0286431 A1 * | 9/2022 | Winn | H04L 63/20 |

* cited by examiner

*Primary Examiner* — Anthony Mejia
(74) *Attorney, Agent, or Firm* — Thomas Horstemeyer, LLP

(57) ABSTRACT

Manifest files for proxies within an application mesh or service mesh are created using parallel computing. Virtual services in a mesh definition are identified. For each of the virtual services, one or more virtual nodes that receive traffic from the virtual service are identified. For each of the virtual nodes that receive traffic from the virtual service, an edge is added to a first graph. Virtual nodes that send network traffic to at least one of the virtual services are then identified. For each virtual node that sends traffic to the virtual service, an edge is added to a second graph. Then an optimized per node network topology is generated based at least in part on the first graph and the second graph.

20 Claims, 5 Drawing Sheets

PARALLELIZED AUTOMATED CREATION OF PROXY MANIFESTS

BACKGROUND

Application meshes are defined by customers to include one or more nodes with one or more connections. The connections between the nodes can have various properties or rules associated with them. For example, some connections may require encryption, while some nodes may only receive and process network requests from a predefined list of other nodes. Similarly, individual virtual nodes could be prohibited from sending network traffic to other virtual nodes unless they are included in a predefined list of allowed nodes.

Due to the high number of possible combinations of routes between nodes within an application mesh, connections are often mapped out using a single-threaded approach to avoid race conditions or accidentally creating cycles in a graph that maps out the routes between the nodes. However, single threaded approaches suffer from performance issues. For example, if an application mesh of a reasonable size is processed using a single threaded approach, it could take large amounts of time to identify all routes in the application mesh in order to convert them to manifest files for the proxies within the application mesh.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for creating manifest files for proxies within an application mesh or service mesh using a parallel computing approach. For example, if changes were made to the application mesh or service mesh, the proxies within the application mesh or service mesh would need to be updated to correctly process and route traffic. Moreover, these changes often need to be propagated as quickly as possible by pushing updated manifests to the proxies within the application mesh or service mesh.

One of the benefits of these approaches is to decrease the amount of time required to identify the routes within an application mesh or service mesh in order to more quickly generate manifests for proxies within the application mesh or service mesh. The use of the parallel computing techniques described herein also make more efficient use of existing computer architectures by utilizing central processor unit (CPU) cores that might otherwise be idle.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
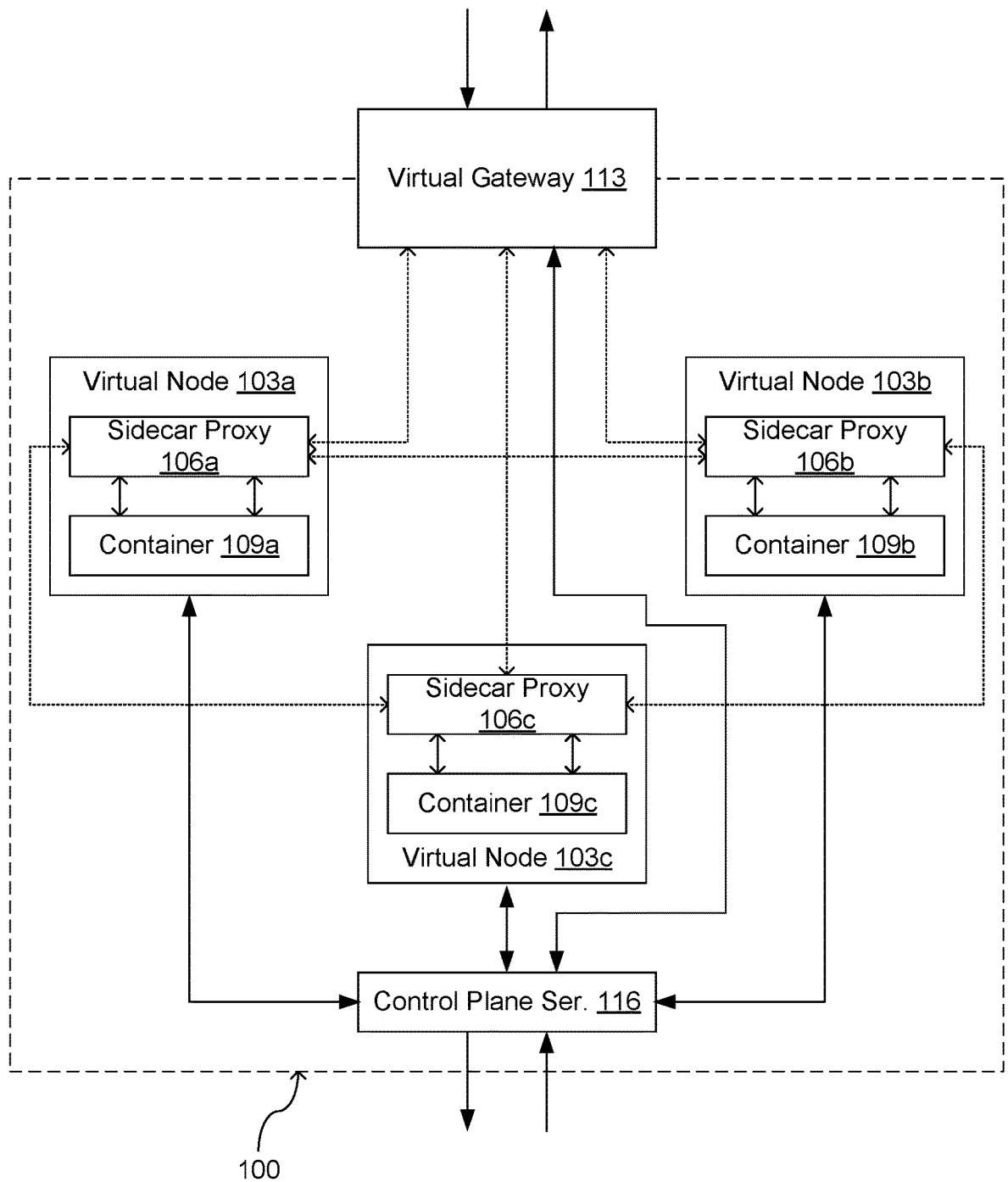
FIG. 1 is a drawing depicting an example of an application mesh according to various embodiments of the present disclosure.

FIG. 1 depicts an example of an application mesh 100 according to various embodiments of the present disclosure. An application mesh 100 is an infrastructure framework for managing applications in a loosely coupled manner. Lightweight application instances using operating-level virtualization (e.g., containers, jails, etc.) are coupled with proxies that intercept and process network communications between the application instances. By segregating the data communications from the application logic, benefits can be provided to applications such as observability into communications, secure communications, load balancing, and automated retries or backoffs for failed requests without the application developer needing to be aware of or implement these features.

Accordingly, the application mesh 100 can include a collection or one or more virtual nodes 103, such as virtual nodes 103a, 103b, and 103c. The virtual nodes 103 can represent sources of and destinations for network traffic within the application mesh 100. Each virtual node 103 can include a sidecar proxy 106, such as side car proxies 106a, 106b, and 106c, and at least one container 109, such as containers 109a, 109b, and 109c. An illustrative example of a virtual node 103 is a KUBERNETES® pod, but other types of virtual nodes 103 can also be utilized by the various embodiments of the present disclosure.

A sidecar proxy 106 can represent a proxy that handles all traffic destined for or originating from the container 109 of the respective virtual node 103. The sidecar proxy 106 can be used to route traffic between virtual nodes 103, encrypt or otherwise secure traffic between virtual nodes 103, block traffic received from or destined for specific virtual nodes 103, load balance traffic, etc. One example of a sidecar proxy 106 is the open-source ENVOY® proxy service. To process network traffic, individual side car proxies 106 can be provided with a manifest file that defines one or more routes or rules for processing traffic on behalf of the virtual node 103. The individual side car proxies 106 can then send or receive network traffic on behalf of the container 109, with the container 109 being unaware of the locations, network paths, or security requirements of the other endpoint.

Routes between the sidecar proxies 106 are depicted using dotted lines, which is how network communications between the containers 109 of the application mesh 100 can occur. For the sake of illustrative purposes, the application mesh 100 depicts each sidecar proxy 106 being fully connected with every other sidecar proxy 106. However, this is not the case in every instance of an application mesh 100. For example, there may not be a route between two sidecar proxies 106, the result of which is that the containers 109 of the respective virtual nodes 103 would be unable to communicate with each other. As another example, a route between two sidecar proxies 106 could be unidirectional, where traffic could be sent from a first container 109 of a first virtual node 103 to a second container 109 of a second virtual node 103, but the reverse would not be possible.

A container 109 can represent any operating system level virtualization that implements an isolated user space instance. For example, a container 109 could be implemented as a container or "pod" implemented by the KUBERNETES container orchestration system, although any orchestration system, virtual machine manager, operating system, or virtual compute manager could provide or implement a container 109. Often, a container 109 will be used to host or provide a network application or service. In these instances, a container 109 provides an operating system environment to the hosted application or service without the overhead of a fully virtualized machine.

The application mesh 100 can also include a virtual gateway 113, which can be used to process network traffic entering the application mesh 100 from other sources (e.g., request from client devices connected to the internet) or traffic from individual virtual nodes 103 destined for locations outside of the application mesh (e.g., responses to requests from client devices connected to the internet or requests sent to third-party services outside the application mesh 100). The virtual gateway 113 can include a proxy service or act as a proxy service in order to process the network traffic. For example, the virtual gateway 113 could decrypt requests received from outside the application mesh 100, route requests to the appropriate virtual node 103, load balance requests by routing requests to duplicate or redundant virtual nodes 103, encrypt responses to the requests, etc.

The application mesh 100 can also include a control plane service 116 or other service that performs similar operations. The control plane service 116 can be executed to control or manage the operation of individual virtual nodes 103 within the application mesh 100, as well as the operation of the virtual gateway 113. The control plane service 116 can push configurations changes or updates to the sidecar proxies 106 of individual virtual nodes 103 or to the virtual gateway 113, thereby updating routing information or network configurations for the individual sidecar proxies 106 or the virtual gateway 113. The control plane service 116 can also cause additional virtual nodes 103 to be instantiated or modify the configuration of virtual nodes 103 (e.g., by causing the virtual node 103 to add additional containers 109). Accordingly, the control plane service 116 can have communications with applications or services outside of the application mesh 100, from which the control plane service 116 can receive configuration updates to be deployed to the sidecar proxies 106 of the application mesh 100 or to the virtual gateway 113.

When a client sends a request for a virtual service 203 to virtual gateway 113, the virtual gateway 113 can evaluate the request. This can include evaluating the uniform resource locator (URL) path included in the request (e.g., in a hypertext transfer protocol (http) request), and determining which virtual node 103 is the destination of the request. The virtual gateway 113 could then forward the request to the appropriate virtual node 103. For example, if the virtual gateway 113 determined that the request was destined for the virtual node 103b, the virtual gateway 113 could forward the request to the sidecar proxy 106b. The virtual gateway 113 could then provide the request to the container 109b for processing.

When the container 109b receives the request, this could generate additional network traffic within the application mesh 100. For example, if the container 109b hosted a web server that generated dynamic web pages, the container 109b could need to make a call to a database hosted or provided by another container 109 (e.g., container 109a). The container 109b could provide a request for the database to the sidecar proxy 106b, which could determine that the URL and port number for the destination database match the database hosted by the container 109a. Accordingly, the sidecar proxy 106b could forward the request to the sidecar proxy 106a, which could then relay the request to the container 109a. The container 109a could then respond to the query with the requested data. The response could be provided to the sidecar proxy 106a, which then relays the response back to the sidecar proxy 106b which, in turn, relays the response to the container 109b. The web server hosted by the container 109b could then generate the web page and provided it in response to the sidecar proxy 106b, which could relay the response containing the webpage to the virtual gateway 113. The virtual gateway 113 could then provide the webpage to the requesting client device or application.

Figure 2:
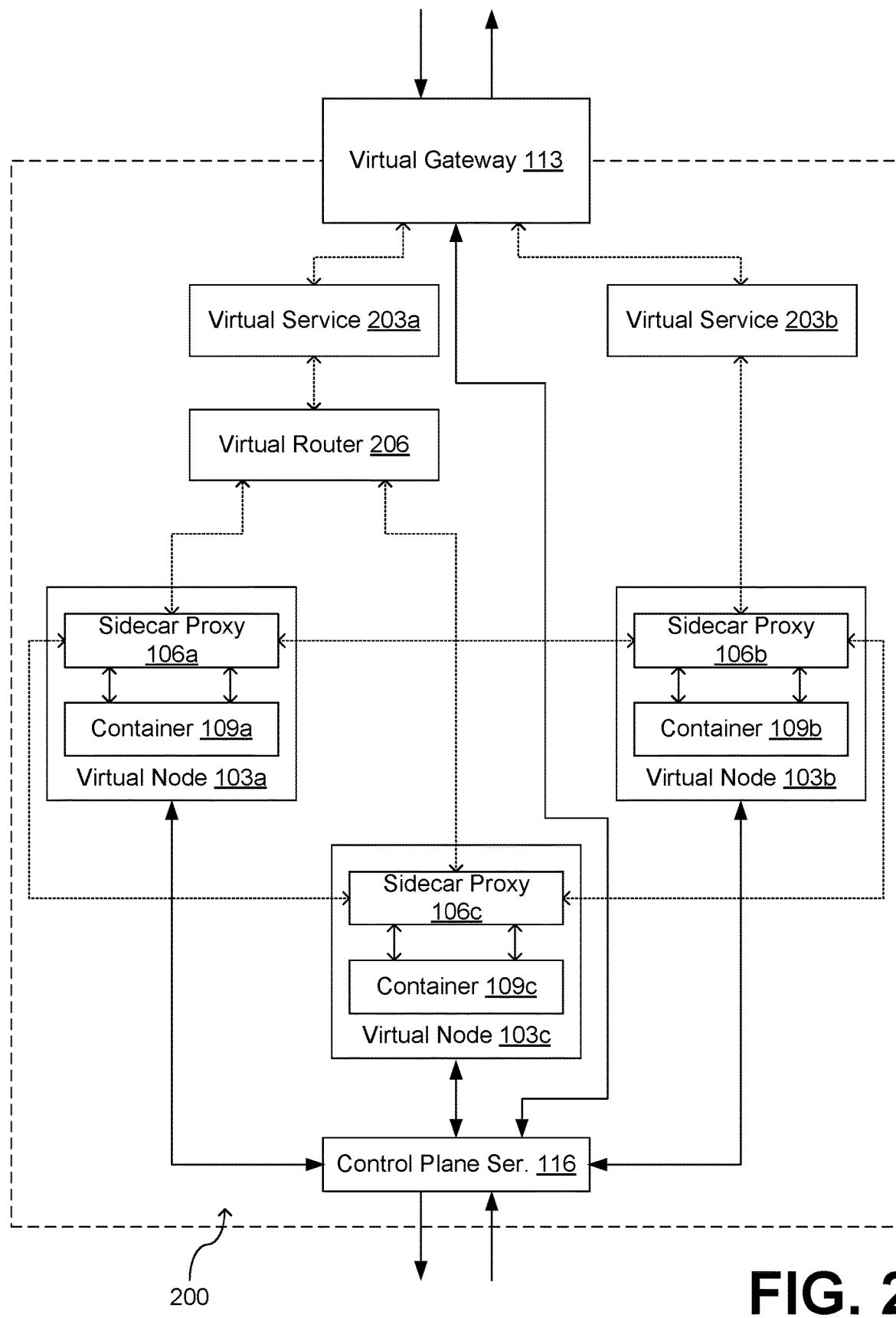
FIG. 2 is a drawing depicting an example of a service mesh according to various embodiments of the present disclosure.

FIG. 2 depicts an example of a service mesh 200 according to various embodiments of the present disclosure. A service mesh 200 is a dedicated infrastructure layer for providing services implemented using one or more backend virtual nodes 103 that are hidden from the requesting application or virtual node 103. Accordingly, a service mesh 200 can be viewed as an extension of an application mesh 100 or a particular type of application mesh 100. While all service meshes 200 are also application meshes 100, not all application meshes 100 would be a service mesh 200.

The service mesh 200 can include a number of features. For example, in addition to one or more virtual nodes 103, virtual gateway 113, and a control plane service 116 the service mesh 200 can include one or more virtual services 203, such as virtual service 203a and 203b. The service mesh 200 can also include one or more virtual routers 206.

A virtual service 203 represents an abstraction of a real application or service that is provided by a virtual node 103 directly, or indirectly by one or more virtual nodes 103 through a virtual router 206. Accordingly, a virtual service 203 can act as a mesh-level descriptor or alias for a virtual node 103 or a virtual router 206.

A virtual router 206 is proxy in the service mesh 200 that can receive network traffic destined for the virtual service 203 and relay it to one or more virtual nodes 103 according to various rules or policies. For example, the virtual router 206 could be used to load balance requests for a virtual service 203 by splitting the requests between two virtual nodes 103. As another example, the virtual router 206 could be used to perform NB testing by sending a portion of requests to one virtual node 103 and another portion of the requests to another virtual node 103.

When a client sends a request for a virtual service 203 to virtual gateway 113, the virtual gateway 113 can evaluate the request. This can include evaluating the uniform resource locator (URL) path included in the request (e.g., in a hypertext transfer protocol (http) request), and determining which virtual service 203 is the destination of the request. The virtual gateway 113 could then forward the request to the appropriate virtual service 203. For example, if the virtual gateway 113 determined that the request was for the virtual service 203a, the virtual gateway 113 could forward the request to the virtual router 206. However, if the virtual gateway 113 determined that the request was for the virtual service 203b, the virtual gateway 113 could forward the request to the sidecar proxy 106b of the virtual node 103b represented by the virtual service 203b.

Figure 3:
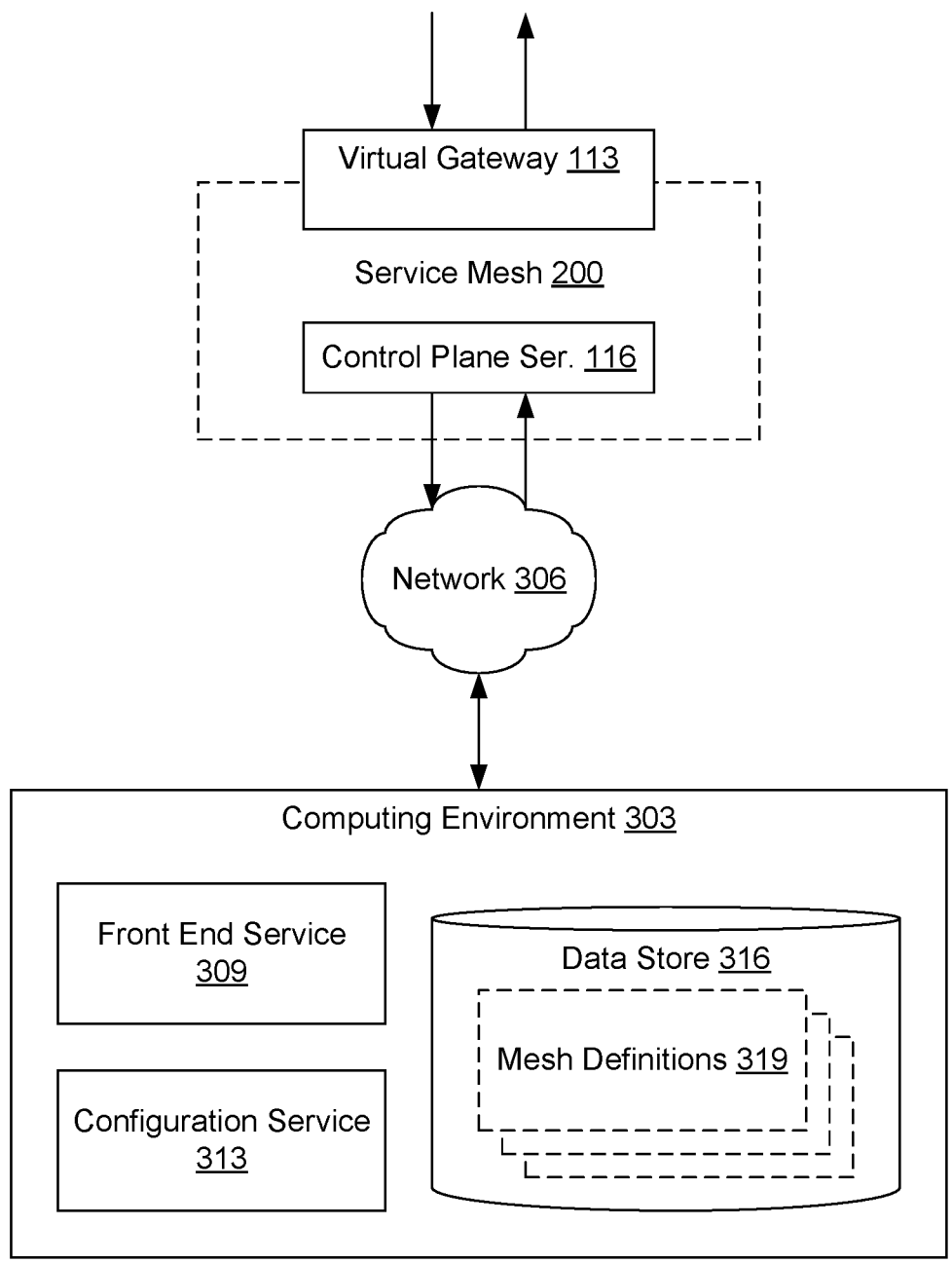
FIG. 3 is a schematic block diagram representing an example of a network environment according to various embodiments of the present disclosure.

If the request was sent to the virtual router 206, then the virtual router 206 could determine whether to send the request to the sidecar proxy 106a of the virtual node 103a or the sidecar proxy 106c of the virtual node 103c. This decision could take into account various factors, such as the load on the virtual node 103a and 103c, which virtual node 103 the last request or series of requests was sent to (e.g., if the goal is to balance the load evenly, and the last request were sent to the sidecar proxy 106a, then the current request could be forwarded to the sidecar proxy 106c). The destination sidecar proxy 106 could then provide the request to the respective container 109 within the virtual node 103. Responses to the request could then be relayed along the same path to the originating application or device With reference to FIG. 3, shown is a network environment 300 according to various embodiments. The network environment 300 can include a computing environment 303 and a service mesh 200, as well as other client or computing devices. These can be in data communication with each other via a network 306.

The network 306 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 306 can also include a combination of two or more networks 306. Examples of networks 306 can include the Internet, intranets, extranets, virtual private networks (VPNs), and similar networks.

The computing environment 303 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 303 can employ a plurality of computing devices that can be arranged in one or more server banks or computer banks or other arrangements. Such computing devices can be located in a single installation or can be distributed among many different geographical locations. For example, the computing environment 303 can include a plurality of computing devices that together can include a hosted computing resource, a grid computing resource or any other distributed computing arrangement. In some cases, the computing environment 303 can correspond to an elastic computing resource where the allotted capacity of processing, network, storage, or other computing-related resources can vary over time.

Various applications or other functionality can be executed in the computing environment 303. The components executed on the computing environment 303 include a front end service 309, a configuration service 313, and other applications, services, processes, systems, engines, or functionality not discussed in detail herein. Although depicted separately for illustrative purposes, the service mesh 200 could be hosted or implemented by the computing devices of the computing environment 303.

Also, various data can be stored in a data store 316 that is accessible to the computing environment 303. The data store 316 can be representative of a plurality of data stores 316, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 316 is associated with the operation of the various applications or functional entities described below. This data can include one or more mesh definitions 319, and potentially other data.

The mesh definitions 319 can represent a definition of the layout or configuration of a service mesh 200. Individual virtual nodes 103 can be defined, including the sidecar proxy 106 or container(s) 109 included in the virtual nodes 103. Other aspects of the service mesh 200 can be defined, such as individual virtual services 203, virtual routers 206, and the virtual gateway 113. For example, the name of a virtual service 203 can be defined as well as the resources (e.g., virtual router 206 or virtual node 103) that the virtual service 203 serves as an alias for. As another example, the virtual nodes 103 served by a virtual router 206 can be defined, as well as the routing policies used by the virtual router 206 to route traffic to the respective virtual nodes 103.

Moreover, connections or routes between virtual nodes 103, virtual services 203, and virtual routers 206 can be defined in the mesh definition 319. For example, the mesh definition 319 could define, for each virtual node 103, virtual service 203, and/or virtual router 206, which other virtual nodes 103, virtual services 203, and/or virtual routers 206 that the virtual node 103 is permitted to send traffic to or receive traffic from. The mesh definition 319 could also define traffic rules or weightings for these connections (e.g., that certain connections should be encrypted, that certain groups of connections should weight or split traffic by a predefined percentage or ratio, etc.). These definitions of connections or routes can then be translated by the configuration service 313 into ingress or egress rules for the respective virtual nodes 103, virtual services 203, and virtual routers 206.

In some implementations, the mesh definition 319 can be implemented using a graph or similar data structure. Virtual nodes 103, virtual services 203, virtual routers 206, and virtual gateways 113 can be represented as nodes in the graph, while the routes between them can be represented as edges between the nodes in the graph. In those implementations that use a graph to represent the mesh definition 319, the graph can be walked or traversed to identify routing paths within the service mesh or to build routing policies for individual sidecar proxies 106 or virtual routers 206 within the service mesh 200.

The front end service 309 can be executed to receive mesh definitions 319 from administrators, owners, or operators of the service mesh 200. In order to receive the mesh definitions 319, the front end service 309 could provide an application programming interface (API) that includes one or more functions that, when called or invoked by another application, allow the front end service 309 to receive a mesh definition 319. The front end service 309 can also be executed to store the mesh definitions 319 in the data store 316 and, once stored, notify the configuration service 313 of the presence of the new mesh definition(s) 319.

The configuration service 313 can be executed to generate manifest files for individual sidecar proxies 106 within the service mesh 200. In response to receiving a notification from the front end service 309 that a new mesh definition 319 has been saved to the data store 316, the configuration service 313 can retrieve the mesh definition(s) 319 and evaluate the mesh definition(s) 319 to create manifest files to configure individual sidecar proxies 106.

Next, a general description of the operation of the various components of the network environment 300 is provided. Although this general description illustrates the interactions between the components of the network environment 300, other interactions or sequences of interactions are possible in various embodiments of the present disclosure.

To begin, the front end service 309 receives a mesh definition 319 for a service mesh 200. The mesh definition 319 could be received, for example, from an application executing on a computing device controlled by an owner, operator, or administrator of the service mesh 200. In response, the front end service 309 can save the mesh definition 319 to the data store 316. In some instances, the mesh definition 319 could be saved in a read-only format to prevent unintended changes to the mesh definition 319.

Once the front end service 309 has written the mesh definition(s) 319 to the data store 316, the configuration service 313 can be notified that the mesh definitions 319 are available. In some instances, the front end service 309 could send a notification to the configuration service 313, while in other implementations, the data store 316 could send the notification to the configuration service 313.

The configuration service 313 could then retrieve each newly saved mesh definition 319 and evaluate each mesh definition 319 to identify all of the routes within the respective service mesh 200. Once all of the routes are identified, one or more manifest files can be generated, with the configuration service 313 in general creating a separate manifest file for each sidecar proxy 106 present in the service mesh 200. The configuration service 313 could push or send each manifest file to the control plane service 116 of the service mesh 200. The control plane service 116 could then push the manifest file to each respective sidecar proxy 106 and cause the sidecar proxy 106 to update itself to use the current configuration specified in the manifest.

In some instances, the control plane service 116 also instantiate or deactivate individual virtual nodes 103, virtual services 203, or virtual routers 206. For example, if a virtual node 103, virtual service 203, or virtual router 206 is specified in one or more of the manifest files, the control plane service 116 could add an additional virtual node 103, virtual service 203, or virtual router 206 to the service mesh 200. As another example, if a virtual node 103, virtual service 203, or virtual router 206 that is currently present in the service mesh 200 is not specified in any of the manifest files provided by the configuration service 313, then the control plane service 116 could remove an additional virtual node 103, virtual service 203, or virtual router 206 from the service mesh 200.

Figure 4:
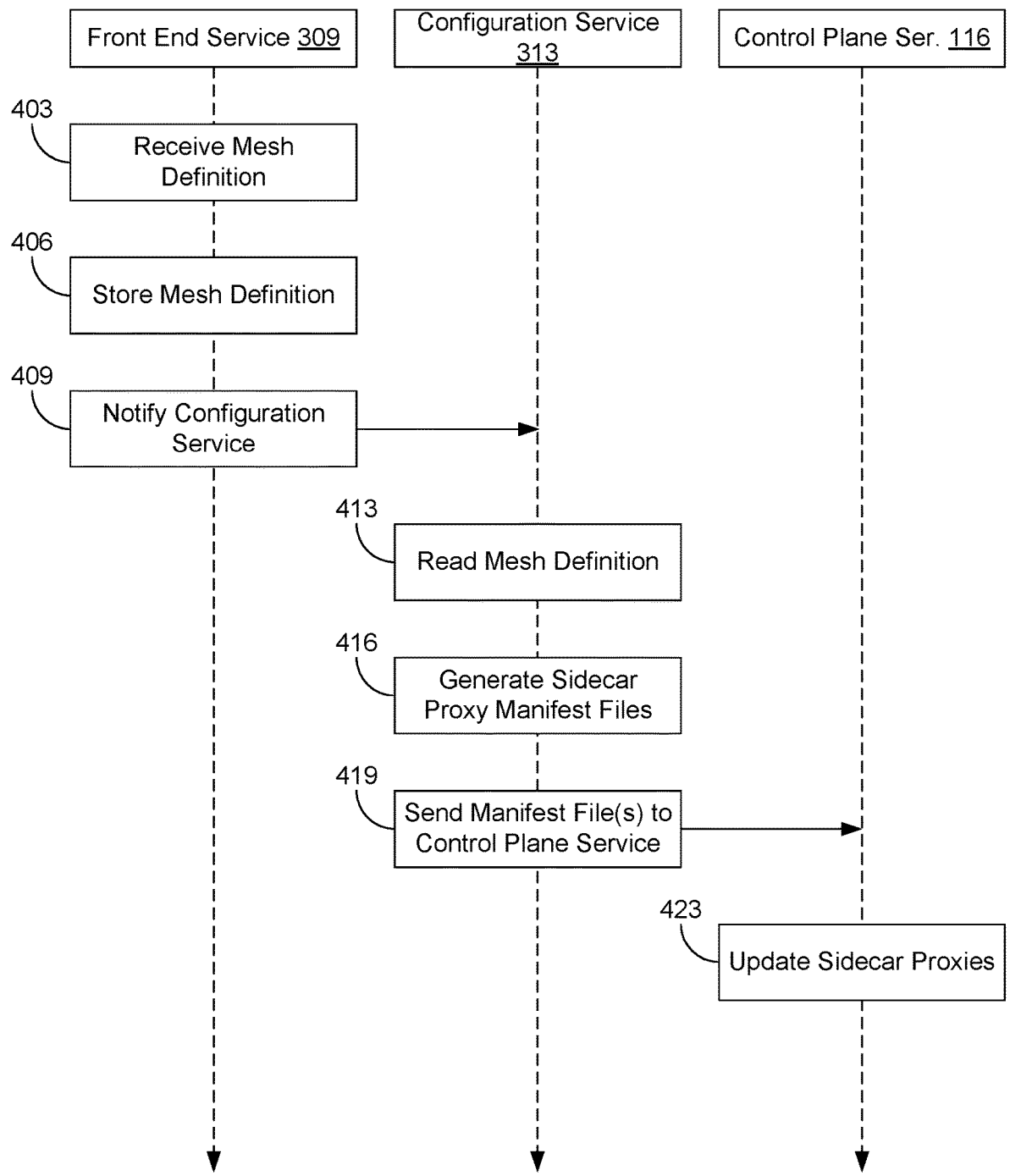
FIG. 4 is a sequence diagram depicting an example of the interactions between various applications in the network environment of FIG. 3 according to various embodiments of the present disclosure.

Referring next to FIG. 4, shown is a sequence diagram that provides one example of the interactions between the applications depicted in network environment 300. The sequence diagram of FIG. 4 provides merely an example of the many different types of interactions between the applications depicted in network environment 300. As an alternative, the sequence diagram of FIG. 4 can be viewed as depicting an example of elements of a method implemented within the network environment 300.

Beginning with block 403, the front end service 309 can receive a mesh definition 319 from a client device or application. For example, the owner, operator, or administrator could upload the mesh definition 319 for a service mesh 200 using an API provided by the front end service 309.

Next, at block 406, the front end service 309 can store the mesh definition 319 in the data store 316 for use by the configuration service 313. The front end service 309 can in some implementations, store the mesh definition 319 as read-only to prevent accidental modification of the mesh definition 319 by other processes. In some implementations, previously provided versions of the mesh definition 319 can be stored in the data store 316 in order to allow rollbacks or reversions to prior versions of the mesh definition 319 (e.g., if the current service mesh 200 or mesh definition 319 contains a configuration error). In some of these implementations, the front end service 309 can indicate to the data store 316 that the mesh definition 319 should be stored as the current or latest version for the service mesh 200. In other implementations, however, the data store 316 could save the most recently received version of the mesh definition 319 as the current or latest version for the service mesh 200.

Then, at block 409, the front end service 309 can notify the configuration service 313 that the mesh definition 319 for the service mesh 200 has been saved to the data store 316. The front end service 309 could use any type of messaging or notification platform, such as AMAZON WEB SERVICES (AWS) Simple Notification Service (SNS) or other types of services. The notification could include information such as the identity of the mesh definition 319, the name or identifier of the service mesh 200, and/or other information which could be used by the configuration service 309 to retrieve the correct mesh definition 319 from the data store 316.

Proceeding to block 413, the configuration service 3139 can read the mesh definition 319 from the data store 316 in response to receiving the notification from the front end service 309. For example, the configuration service 309 could send a query to the data store 316 specifying the identity of the mesh definition 319, the name or identifier of the service mesh 200, and/or other information received at block 409. The configuration service 313 could then receive the mesh definition 319 from the data store 316 in response.

Moving on to block 416, the configuration service 313 can generate manifest files for each of the sidecar proxies 106 of the virtual nodes 103, virtual gateway 113, virtual services 203, and/or virtual routers 206 specified in the mesh definition 319. The process for generating the manifest files is described in further detail in the flowchart of FIG. 5. In general though, each sidecar proxy 106 can be identified, as well as all of the routes originating from or terminating with the sidecar proxy 106. A manifest file can then be created for the sidecar proxy 106 which defines the routes, as well as any route specific information or route specific ingress rules or egress rules (e.g., traffic shaping rules, traffic blocking rules, network security rules, etc.). Each manifest file can also identify the sidecar proxy 106 that it is meant to configure.

Subsequently, at block 419, the configuration service 313 can send the manifest file for each sidecar proxy 106 to the control plane service 116 for deployment.

Next, at block 423, the control plane service 116 can deploy each manifest file to the respective sidecar proxy 106. For example, the control plane service 116 could evaluate a manifest file to determine which sidecar proxy 106 it applies to. The control plane service 116 could then push or send the manifest file to the appropriate sidecar proxy 106. In some instances, sending the new manifest file to the sidecar proxy 106 will cause the sidecar proxy 106 to automatically update its traffic processing rules. In other instances, the control plane service 116 could send a command to the sidecar proxy 106 to reload the manifest file to update its configuration. Once the sidecar proxy 106 is updated to reflect the route definitions in the manifest file, the process can end.

Figure 5:
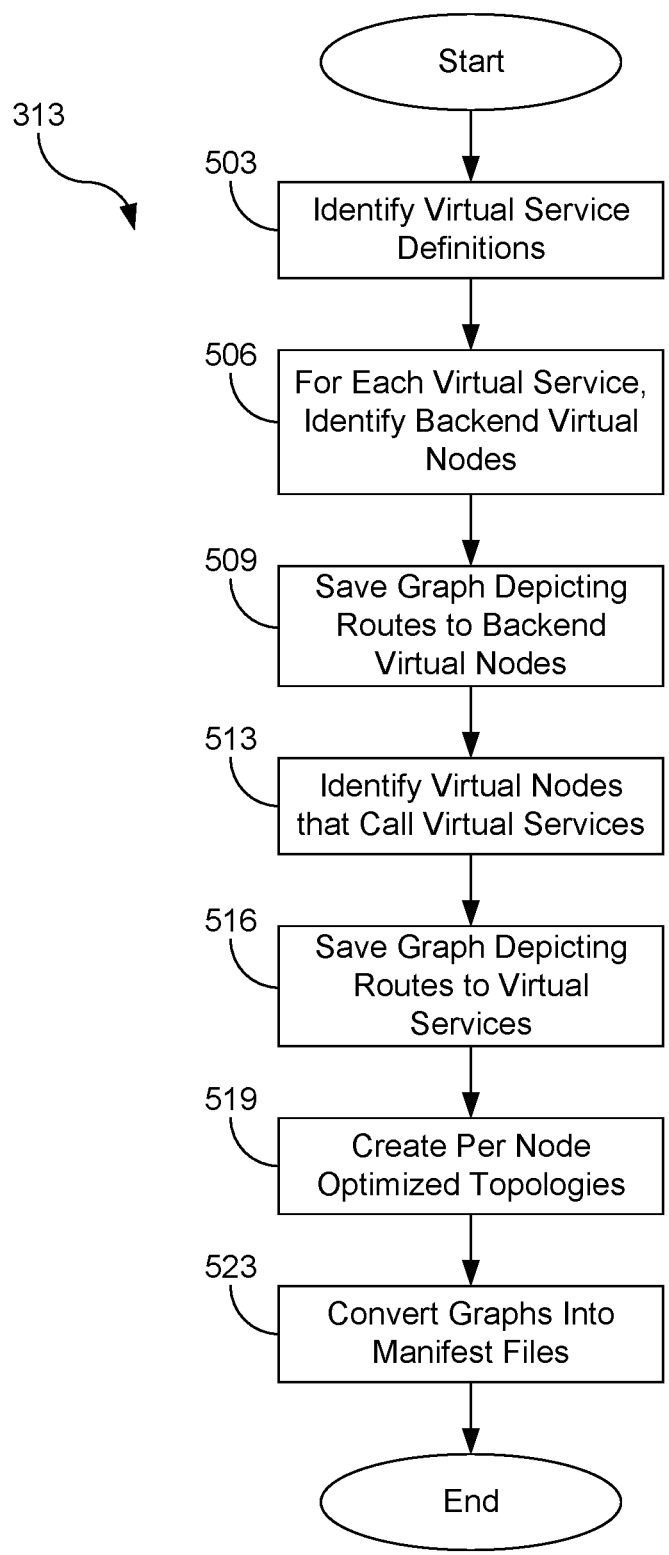
FIG. 5 is a flowchart illustrating one example of functionality implemented as portions of an application executed in a computing environment in the network environment of FIG. 3 according to various embodiments of the present disclosure.

Referring next to FIG. 5, shown is a flowchart that provides one example of the operation of a portion of the configuration service 313. The flowchart of FIG. 5 provides merely an example of the many different types of functional arrangements that can be employed to implement the operation of the depicted portion of the configuration service 313. As an alternative, the flowchart of FIG. 5 can be viewed as depicting an example of elements of a method implemented within the network environment 300.

Beginning with block 503, the configuration service 313 can identify the virtual services 203 defined in the mesh definition 319 for a service mesh 200. For example, the configuration service 313 can parse or evaluate the mesh definition 319 to identify individual virtual services 203.

Then, at block 506, the configuration service 313 can identify those virtual nodes 103 that provide the backend functionality of a virtual service 203. This could be done by selecting a virtual service 203 to act as a root node for a directed acyclic graph (DAG), then selecting all virtual nodes 103 that are defined in the mesh definition 319 as destinations for traffic sent to the virtual service 203. For each identified virtual node 103, the configuration service 313 could identify additional virtual nodes 103 that are destinations for network traffic from the first set of identified virtual nodes 103 (e.g., such as when a virtual node 103 that provides a web server communicates with a second virtual node 103 hosting a database application). The configuration service 313 could continue identifying virtual nodes 103 in the DAG by searching for additional levels of virtual nodes 103 below the virtual service 203. As a new connection between the virtual service 203 and a virtual node 103, or between two virtual nodes 103, is identified, an edge can be added to a graph representing the route between the virtual service 203 and the virtual node 103 or between the two virtual nodes 103. This could be done using either a depth first search or a breadth first search approach.

As an illustrative example, virtual nodes 103 that provide the backend functionality of the virtual service 203 include those nodes for which the virtual service 203 directly, or indirectly, acts as an alias. For example, in FIG. 2, virtual service 203a acts as an alias for virtual nodes 103a and 103c, which are reachable via the virtual router 206. Therefore, the virtual node 103a and the virtual node 103c are the backend nodes for the virtual service 203a. Meanwhile, virtual service 203b acts as an alias for virtual node 103b, so virtual node 103b also serves as the backend node for the virtual service 203b.

Moreover, virtual nodes 103 that act as a backend for a virtual service 203 can be several layers deep. For example, in FIG. 2, both virtual node 103a and virtual node 103c have routes with virtual node 103b. As a result, virtual node 103b could be considered as an additional backend node for the virtual service 203a. Accordingly, virtual nodes 103a and 103c would be virtual nodes 103 placed at a first level of a directed acyclic graph (DAG), such as a tree, with the virtual service 203a as its root, while virtual node 103b would sit at a second level of the DAG. As another example, in FIG. 2, virtual node 103b has routes to virtual nodes 103a and 103c. Therefore, virtual nodes 103a and 103c could similarly be considered additional backend nodes for virtual service 203b. Accordingly, virtual node 103b would be the virtual node placed at a first level of a DAG with the virtual service 203b at its root, while virtual nodes 103a and 103c would sit at a second level of the DAG.

It should be noted that because the virtual services 203 are separate and distinct entities, the functionality of block 506 could be performed in parallel. For example, if there were 1,000 virtual services 203 defined in the mesh definition 319, the operations described at block 506 could be concurrently performed on all 1,000 virtual services 203.

Next, at block 509, the configuration service 313 could save the graph depicting the routes identified at block 506. For example, the configuration service 313 could save the results in an intermediate format that identifies each virtual node 103 identified at block 506 and all of the routes to or from the virtual node 103 that were identified at block 506. Edges between the virtual service 203 and the virtual nodes 103, or between virtual nodes 103 and subsequent virtual nodes 103, could be used to represent a route from the virtual service 203 to a virtual node 103.

Moving on to block 513, the configuration service 313 can identify any remaining virtual nodes 103 that call the virtual service 203 (e.g., those virtual nodes that may send traffic or requests to the virtual service 203). This can be done in several ways. First, each virtual node 103 specified in the mesh definition 319 could be evaluated to determine if it has one or more routes specified to one or more respective virtual services 203. As an alternative, the configuration service 313 could evaluate the definitions of the virtual services 203 in the mesh definition 319 to identify those virtual nodes 103 for which the virtual services 203 are configured to or authorized to receive traffic from. As a new connection between a virtual node 103 and the virtual service 203 is identified, an edge can be added to a graph representing the route between the virtual node 103 and the virtual service 203. This process could also be done in parallel, with individual virtual nodes 103 being separately, but concurrently, evaluated.

Proceeding to block 516, the configuration service 313 could save the graph depicting the routes identified at block 513. For example, the configuration service 313 could save the results in an intermediate format that identifies each virtual node 103 identified at block 513 and all of the routes to or from the virtual node 103 that were identified at block 513. Edges between the virtual service 203 and the virtual nodes 103 could be used to represent a route to the virtual service 203 from a virtual node 103.

Subsequently, at block 519, the configuration service 313 can generate per node optimized network topologies from the graphs saved at blocks 509 and 516. For example, the configuration service 313 could retrieve all of the routes saved in the graphs that are associated with an individual virtual node 103 and combine the routes into an optimized network topology focused on, emanating from, or originating with the virtual node 103.

Then, at block 523, the configuration service 313 can create or generate individual manifest files for respective sidecar proxies 106 in the service mesh 200 from the per node optimized network topologies created at block 519. As part of this process, the configuration service 313 could also add any additional routing or network processing rules specified in the mesh definition 319 (e.g., security settings, traffic weightings or load balancing, etc.) to the manifest.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        receive a notification that mesh definition has been saved to a data store, the mesh definition specifying a plurality of virtual nodes in a service mesh, a plurality of virtual services in the service mesh, and a first plurality of routes between individual ones of the virtual nodes and a second plurality of routes between respective ones of the virtual services and one or more of the virtual nodes;
        obtain the mesh definition from the data store;
        identify the plurality of virtual services in the mesh definition for a service mesh;
        in parallel for each of the plurality of virtual services, identify one or more virtual nodes that receive traffic from the virtual service;
        for each of the virtual nodes that receive traffic from the virtual service, add an edge to a first graph, the edge representing the route from the virtual service to the virtual node;
        identify one or more virtual nodes in the service mesh that send network traffic to at least one of the plurality of virtual services;
        in parallel for each virtual node that sends traffic to the virtual service, adding an edge to a second graph, the edge representing the route from the virtual node to the virtual service;
        create a plurality of manifests for respective sidecar proxies of the plurality of virtual nodes in the service mesh, individual ones of the plurality of manifests containing a set of routes represented by a set of edges connected to a respective virtual node associated with a respective sidecar proxy; and
        send the plurality of manifests to a control service of the service mesh.

2. The system of claim 1, wherein the notification that mesh definition has been saved to the data store is received in response to a front end service receiving a copy of the mesh definition and saving the mesh definition to the data store.

3. The system of claim 1, wherein the mesh definition further defines one or more network processing rules for individual routes between virtual nodes or between a virtual service and a virtual node.

4. The system of claim 3, wherein the one or more network processing rules comprise at least one of a security setting for one or more of the individual routes or a traffic weighting for one or more of the individual routes.

5. A method, comprising:
    identifying a plurality of virtual services in a mesh definition for a service mesh;
    for each of the plurality of virtual services, identifying one or more virtual nodes that receive traffic from the virtual service;
    for each of the virtual nodes that receive traffic from the virtual service, adding an edge to a first graph, the edge representing the route from the virtual service to the virtual node;
    identifying one or more virtual nodes in the service mesh that send network traffic to at least one of the plurality of virtual services;
    for each virtual node that sends traffic to the virtual service, adding an edge to a second graph, the edge representing the route from the virtual node to the virtual service; and
    generate an optimized per node network topology based at least in part on the first graph and the second graph.

6. The method of claim 5, further comprising:
    creating a plurality of manifests for respective sidecar proxies of the plurality of virtual nodes in the service mesh based at least in part on the optimized per node network topology, individual ones of the plurality of manifests containing a set of routes represented by a set of edges connected to a respective virtual node associated with a respective sidecar proxy; and
    sending the plurality of manifests to a control service of the service mesh.

7. The method of claim 5, wherein adding the edge to the first graph for each of the virtual nodes that receive traffic from the virtual service is performed in parallel for each of the plurality of virtual services.

8. The method of claim 5, wherein adding the edge to the second graph for each virtual node that sends traffic to the virtual service is performed in parallel for each of the one or more virtual nodes.

9. The method of claim 5, further comprising:
    receiving a notification that the mesh definition has been saved to a data store; and
    retrieving the mesh definition from the data store.

10. The method of claim 9, wherein receiving the notification that the mesh definition has been saved to a data store occurs in response to a front end service receiving a copy of the mesh definition and saving the mesh definition to the data store.

11. The method of claim 5, wherein the mesh definition includes an identifier of the service mesh.

12. The method of claim 5, wherein the mesh definition further defines one or more network processing rules for individual routes between virtual nodes or between a virtual service and a virtual node.

13. A system, comprising:
    a computing device comprising a processor and a memory; and
    machine-readable instructions stored in the memory that, when executed by the processor, cause the computing device to at least:

obtain a mesh definition for a service mesh from the data store;

identify a plurality of virtual services in the mesh definition;

in parallel for each of the plurality of virtual services, identify one or more virtual nodes that receive traffic from the virtual service;

for each of the virtual nodes that receive traffic from the virtual service, add an edge to a first graph, the edge representing the route from the virtual service to the virtual node;

identify one or more virtual nodes in the service mesh that send network traffic to at least one of the plurality of virtual services;

in parallel for each virtual node that sends traffic to the virtual service, adding an edge to a second graph, the edge representing the route from the virtual node to the virtual service; and generate an optimized per node network topology based at least in part on the first graph and the second graph.

14. The system of claim 13, wherein the machine-readable instructions, when executed by the processor, further cause the computing device to at least:

create a plurality of manifests for respective sidecar proxies of the plurality of virtual nodes in the service mesh based at least in part on the optimized per node network topology, individual ones of the plurality of manifests containing a set of routes represented by a set of edges connected to a respective virtual node associated with a respective sidecar proxy; and send the plurality of manifests to a control service of the service mesh.

15. The system of claim 13, wherein the machine-readable instructions, when executed by the processor, further cause the computing device to at least receive a notification that mesh definition has been saved to a data store, in response to a front end service receiving a copy of the mesh definition and saving the mesh definition to the data store.

16. The system of claim 13, wherein the machine-readable instructions that cause the computing device to at least obtain a mesh definition for a service mesh from the data store.

17. The system of claim 13, wherein the mesh definition specifies a plurality of virtual nodes in the service mesh, a plurality of virtual services in the service mesh, and a first plurality of routes between individual ones of the virtual nodes and a second plurality of routes between respective ones of the virtual services and one or more of the virtual nodes.

18. The system of claim 17, wherein the mesh definition further defines one or more network processing rules for individual routes between virtual nodes or between a virtual service and a virtual node.

19. The system of claim 18, wherein the one or more network processing rules comprise a security setting for one or more of the individual routes.

20. The system of claim 13, wherein the one or more network processing rules comprise a traffic weighting for one or more of the individual routes.

\* \* \* \* \*